United States Patent [19]

Dufresne

[11] 3,919,448
[45] Nov. 11, 1975

[54] MODIFIED ELASTOMERIC COMPOSITIONS, METHOD AND OIL SEALS MADE THEREFROM

[75] Inventor: Eugene R. Dufresne, Glen Ellyn, Ill.

[73] Assignee: Chicago Rawhide Manufacturing Company, Elgin, Ill.

[22] Filed: July 30, 1973

[21] Appl. No.: 383,702

Related U.S. Application Data

[63] Continuation of Ser. No. 179,717, Sept. 13, 1971, abandoned.

[52] U.S. Cl. ............ 428/157; 260/33.2 R; 260/901; 277/153; 277/165; 277/DIG. 6; 428/192; 428/522
[51] Int. Cl.² ................... B32B 3/02; C08K 5/06
[58] Field of Search ...... 260/33.2 R, 901; 161/231, 161/184, 149, 256, 118; 277/DIG. 6, 235, 165, 153

[56] References Cited
UNITED STATES PATENTS 2,718,509  9/1955  Lundsted et al. ............. 260/33.2 R

OTHER PUBLICATIONS

Hofmann, W., Vulcanization and Vulcanizing Agents, London, Maclaren & Sons Ltd., 1967, pp. 281–285.

*Primary Examiner*—George F. Lesmes
*Assistant Examiner*—Stanley S. Silverman
*Attorney, Agent, or Firm*—James T. Fitzgibbon

[57] ABSTRACT

An oil seal and novel rubber composition especially adapted for use as an oil seal material and thus requiring highly specialized physical properties. The rubber comprises a major portion of a polyacrylate elastomer having therein up to about 25% of a modifier imparting outstanding low temperature performance to rubber compositions which are otherwise unsuited for use in very low temperature environments. A preferred seal is made from a rubber composition which includes, based on 100 parts of rubber, about 15 parts of a hydroxy terminated block polymer of ethylene oxide and propylene oxide. The acrylate rubbers which may be used are selected from a variety of compositions, including commercially available acrylate rubbers which are cured by a soap-sulfur cure mechanism.

7 Claims, 4 Drawing Figures

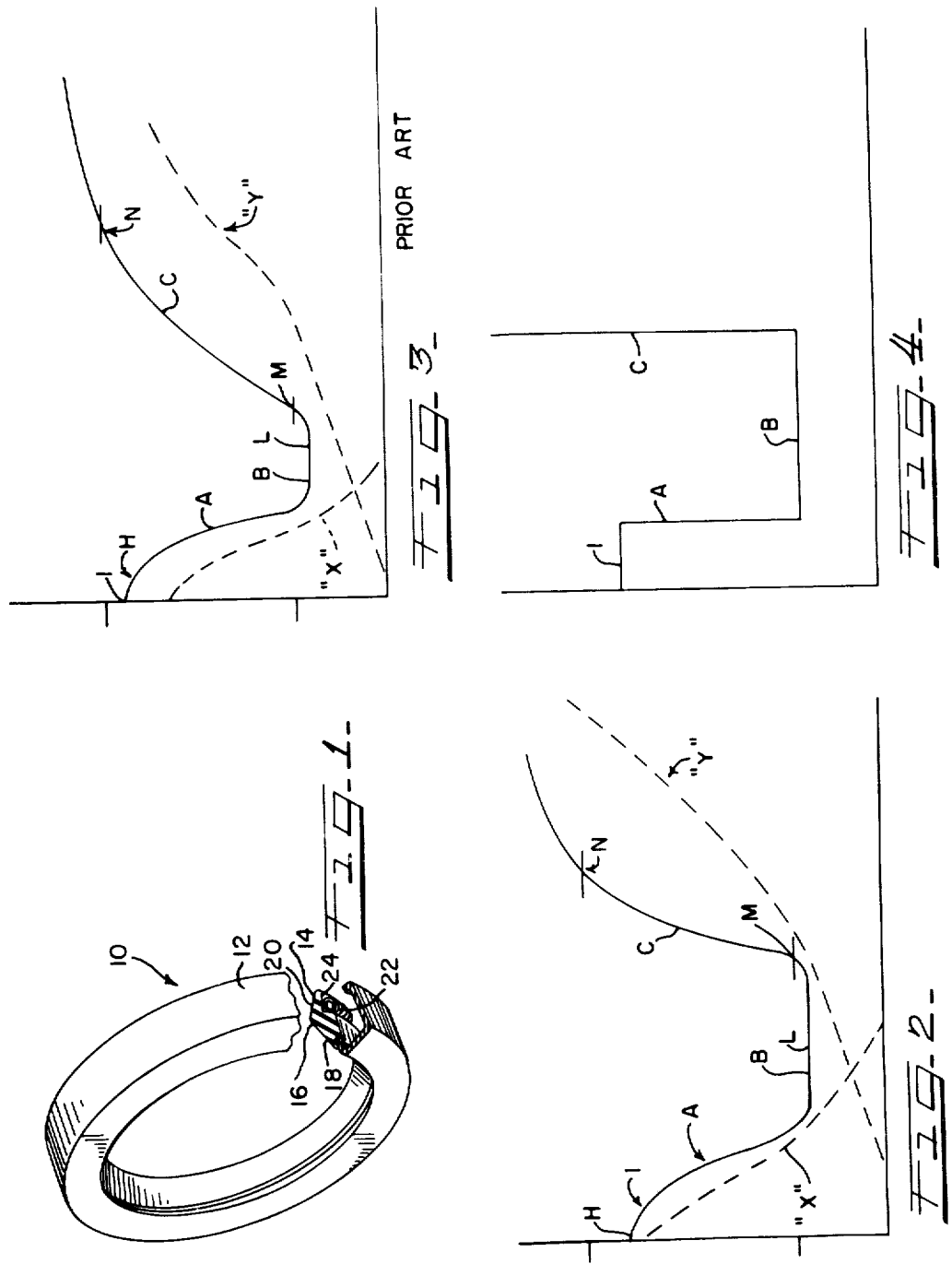

3,919,448

MODIFIED ELASTOMERIC COMPOSITIONS, METHOD AND OIL SEALS MADE THEREFROM

RELATED APPLICATIONS

This application is a continuation of my application Ser. No. 179,717, filed Sept. 13, 1971, now abandoned.

BACKGROUND OF THE INVENTION

The present invention relates to elastomeric compositions and methods of making the same, as well as to articles such as oil seals and other products made from such compositions. More particularly, the invention relates to elastomeric compositions having novel plasticizers and cure accelerators therein which impart novel and heretofore unattainable characteristics to such specialty elastomers and products made therefrom.

In recent years, increasing numbers of synthetic elastomers have become commercially available for selection by designers in making a wide variety of products. In contrast to conditions in the past, when product designers were limited to a few choices among natural rubbers and relatively primitive synthetic rubbers, the designer or product engineer of today may choose from among not only natural and simple synthetic rubbers, but also from among nitrile rubbers, chloroprene rubbers, isoprene rubbers, acrylate rubbers, silicone rubbers, fluorosilicone rubbers, and other elastomers of varying chemical compositions and structures. In selecting a desired rubber compound for a given application, first consideration is given to the properties desired for the finished product in view of the conditions expected to be encountered thereby. Materials engineers concerned with such points are also much interested in whether the selected composition will display these properties over a long period of time and whether manufacturing and processing economies are such that use of the elastomer in question is practical.

For example, a major portion of oil and grease seals of all types are now made from synthetic rubbers, with such seals commonly including a metal case having the rubber material directly adhesively bonded thereto. At present, a large number of seal elements are made from nitrile rubbers, which are known to possess an excellent combination of economy, wear resistance, oil resistance, and high temperature resistance. However, nitrile rubbers are far from ideal for all installations, because, for example, nitrile rubbers possess less wear resistance and ability to withstand high temperatures for prolonged periods of time than do polyacrylate rubbers. Many other rubbers of the type referred to above are not commonly used for oil seals because they undergo excessive oil swelling, because plasticizers therefor are leached out by the oil, because they exhibit poor tear strength, either when hot, cold, or both, because their resistance to other chemicals is not sufficient or, in the case of more exotic materials, because their cost is too high to justify their use in all but very limited applications. In fact, in many respects, polyacrylate rubbers are considered to be almost ideal, being superior to most other oil seal rubbers, except for one principal drawback, namely, the possession of poor performance at low temperatures. This drawback is characteristically manifested by undue stiffening and even cracking at low temperatures, and by rapid low temperature wear of finished oil seals or other like parts.

In this connection, it may be observed that although unmodified polyacrylates are commonly used for oil seals in Europe, the weather conditions in the United States and many other countries where automobile and aircraft production is carried out on a mass scale are such that polyacrylate seals simply are not satisfactory. In this connection, high temperature performance is very important for automobile designs, particularly with the increased advent of both air cooled automobiles and automobiles having cooling systems which are sealed under relatively high pressure, and which accordingly tend to run at increased temperatures. It is also well known in industry that the advent of so-called anit-pollution devices has caused automobile engines to run at elevated temperatures. Turning specifications written for new automobiles by manufacturers, if followed, tend also to cause engines to run at raised temperatures. Moreover, other applications of extreme temperatures include the field of air cooled aircraft engines and the like which are operable at very high altitudes and yet which operate under high temperature conditions at or near sea level. Where seals are used to protect valuable major components, such as engines, transmissions, and the like, it is particularly important that the seal be at least as reliable as the major components of the machine in question, since, although the seal is relatively inexpensive, failure thereof could lead to ultimate destruction of the unit with which it is associated, resulting in great expense for the user and dissatisfaction with the manufacturer. Clearly, warranty claims on major machine elements also might well arise if seals fail to perform, thereby failing to protect expensive and valuable equipment.

Up until the present time, the chronic problem of low temperature performance of polyacrylate rubbers has been recognized, but has not been able to be solved. Although present day polyacrylate rubbers especially designed for low temperature applications are improved in respect to their counterparts of some years ago, the approaches ordinarily taken to forming low temperature polyacrylate compositions have not proven satisfactory, particularly for the oil seal industry. For example, although it has been a matter of general knowledge that addition of sufficient amounts of plasticizer, to certain rubber formulations will decrease the stiffness thereof at low temperatures, it has generally been held a corollary of this belief that the rubber would be unduly flexible at the higher temperature also normally expected to be encountered in oil seal applications.

The difficulty of proper selection of plasticizers for oil seal rubbers has also been increased when chemically related considerations are taken into account. For example, common low molecular weight plasticizers either evaporate under the temperature encountered in processing or are able to be leached out of the rubber component of an oil seal after exposure to oil for a short time. Attempts to incorporate various other plasticizers into oil seal rubber compositions of various types have met with little or no success, since, for a number of reasons, most commonly proposed plasticizers characteristically have one or more drawbacks associated with their use, particularly in the oil seal environment.

In addition to problems of incompatibility with the ultimate oil environment to which the finished rubber product will be exposed, many plasticizers have served to interfere with the curing reaction of the rubber, thereby presenting an economic disadvantage. In addition to causing a slow or incomplete cure, which adversely affects the properties obtainable in the finished product, the necessity of leaving the curing rubber composition in very expensive molds over a relatively long period of time reduces effective mold utilization. Bearing in mind that oil seals are sold at low cost in large numbers, and that the cost of making precision molds is very great in relation to the cost of oil seals made therefrom, the disadvantages of this situation may be easily appreciated. Accordingly, where excessive cure times are required, the mold units must be operated very inefficiently.

A partial alternative to this situation has been the provision of extra equipment to impart a so-called post-cure or further baking operation to oil seals characterized by rubber parts having a slo cure rate. Because removing seals from molds involves stretching and distorting them, it is required that the seals attain at least a minimum tensile strength before removal is attempted; therefore, even where postcuring is available, it does not solve the problem of inefficient mold utilization.

In view of the foregoing, there has been a need for a specialty polyacrylate rubber composition which would inherently possess all the well known advantages of excellent oil seal performance consistent with moderate cost, but which would also be free from the chronic drawbacks characteristically associated therewith, namely lack of satisfactory low temperature performance, chemical compatibility problems, and other problems presented by the working environment of the seal.

In view of the foregoing, an object of the present invention is to provide an improved polyacrylate rubber composition.

Another object is to provide an improved oil seal.

An additional object is to provide an oil seal wherein the rubber portion has greatly improved physical properties.

A further object is to provide a rubber composition having a major portion thereof comprising a polyacrylate rubber and also having an additional component therein which will impart superior low temperature characteristics to the finished product.

Another object is to provide a method of making an improved rubber composition and improved articles made therefrom.

A still further object is to provide molded rubber articles capable of use throughout an extended temperature range.

A still further object is to provide a rubber composition which includes plasticizers therein which improve low temperature characteristics of the finished product but which do not adversely affect any other desirable properties of the product or composition.

A still further object is to provide a rubber composition which includes a plasticizer having a favorable effect on the curing reaction of the rubber product.

Another object is to provide a rubber product which may include relatively small or relatively large amounts of plasticizer, depending on the desired properties of the finished product, and wherein the desired plasticizer can be selected from among a number of commercially available compositions.

Still another object is to provide an oil seal which resists cracking at low temperatures and which resists attach by oil and oil products.

A still further object is to provide a polyacrylate rubber composition having a novel block polymer type plasticizer incorporated therein and cured by the soap-sulfur cure mechanism.

Another object is to provide a rubber composition having up to about 25 parts, based on 100 parts of rubber material, of an hydroxyl terminated block polymer of ethylene oxide and propylene oxide.

A still further object is to provide a rubber composition having a plasticizer therein with a molecular weight varying from about 1,000 up to about 12,000 or more.

Still another object is to provide an improved method of making an oil seal.

A still further object is to provide an oil seal made from compositions of the type described herein.

The manner in which the invention is carried out will become more clearly apparent when reference is made to the accompanying description of several preferred embodiments of the invention set forth merely by way of example, and by reference to the accompanying drawings.

BRIEF DESCRIPTION OF THE DRAWINGS

FIG. 1 shows an oil seal having a flexible body portion made with the improved rubber composition of the invention;

FIG. 2 shows a graph illustrating the rheological characteristics of rubber compositions made according to the invention;

FIG. 3 is a graph showing such characteristics in prior art rubber compositions; and FIG. 4 is a graph showing the ideal flow characteristics of compositions used in molding rubber articles.

DESCRIPTION OF THE PREFERRED
EMBODIMENTS OF THE INVENTION

In order to contrast the outstanding characteristics of rubbers made according to the present invention with prior art rubbers, and bearing in mind that a principal use of the rubber of the invention is in an oil seal environment or application, a prior art acrylic rubber was selected from a commercial source with which contact was made in an attempt to obtain an acrylate rubber which showed the best low temperature performance available at the time of making the present invention. This rubber was characterized as an ethyl acrylate-terpolymer which was able to be cured in about 4 minutes at about 240°, which could be cured by the soap-sulfur system, and which was characterized as being capable of an improvement of 20° to 30°F in respect to the low temperature utility of theretofore available acrylate rubbers. A further description of this rubber and similar rubbers appears elsewhere herein. This rubber was described by its manufacturer as being superior to all existing low temperature acrylate rubbers.

The finished product was made with a 185 part formula which included about 100 parts of rubber and 1 phr (herein and hereafter "parts per hundred of rubber") of stearic acid, 80 phr of carbon black and about 0.25 phr of sulfur, with about 3 to 4 phr of mixed sodium and potassium stearate. Such a rubber, after mixing at about 195°F for 15 to 25 minutes appeared smooth and glossy. When evaluated by standard methods, this rubber exhibited a 250° Mooney scorch time of about 3 minutes and a cure time of 5 minutes, and a 340° Mooney scorch time of 2.8 minutes. Although this composition increased considerably in viscosity to a pseudocure state after 5 minutes, the cure curve did not reach a definite plateau even after 20 minutes.

After being prepared and cured at 340°F for 4 and 8 minutes, respectively, a pair of samples displayed a so-called 100% modulus of 300 and 500 psi respectively, a tensile strength of 1500 and 1800 psi respectively, with elongations of 380% and 280% respectively, and a hardness (Durometer A) of 70 and 73. After an 8 hour tempering cure ("postcure") at about 350°F, samples initially cured for 4 minutes showed elongation diminished to about 150%, Durometer hardness raised to 82 and a tensile strength approaching 2000 pounds, with the 100% modulus approaching 1200 pounds. The finished product, by the differential thermal analysis method, displayed a brittle point of −14°. Samples made were subjected to the usual bending tests and dimensional stability tests related to temperature resistance, various A.S.T.M. oil tests and other fluid resistance tests, etc. Although generally satisfactory as far as rubber properties in the ordinary sense are concerned, the control sample was clearly not suitable for use in making oil seals which would be useful at temperatures reasonably expected to be encountered in continental North America.

Example 1

Using the control rubber as a basis for comparison, the same or similar acrylate rubber was prepared using substantially the same ingredients referred to above, but the composition of Example 1 included 7 phr of a plasticizer having a molecular weight of about 4200 and characterized as an hydroxy-terminated block polymer containing a plurality of ethylene oxide units on either side of a central polypropylene oxide chain. About 50% of the polymer was comprised of ethylene oxide units and about 50% of propylene oxide units, the propylene oxide units being isopropylene oxide, or secondary propylene oxide, that is, propylene unit with one carbon to which an adjacent oxygen is bonded being a secondary carbon having attached thereto respectively, the oxygen, another carbon, a methyl side group and one hydrogen. In this connection, it will be observed that the methyl side group is preferred to maintain fluidity in the pure state and to confer effective plasticity to the finished rubber composition. These desiderata for rubber plasticizers are well known in the art.

The above material, which was used herein as a plasticizer, was available on the market for other intended purposes from Wyandotte Chemical Company, Wyandotte, Mich. under the trade name "Pluronic P-75" and is described in Wyandotte Brochure No. 3377R.

A rubber made according to the foregoing example and otherwise generally along the lines set forth in connection with the description of the control was found to display greatly improved low temperature characteristics, and, when formed into an oil seal, demonstrated the capacity to be operated very satisfactorily at temperatures down to about -40°F, whereas the control unit, representing what is believed to be the best prior art practices, showed a brittle point of at least 20° or more higher. The product of Example 1 easily passed all tests to which the other rubber was subjected, including the A.S.T.M. standard tests well known to those skilled in the art. These tests proved conclusively that a finished oil seal made with this rubber composition was eminently satisfactory in every way for use as an oil seal exposed to motor oil, other oils, and automatic transmission fluid, for example. In other words, this seal was commercially acceptable as an oil seal, whereas oil seals made with polyacrylate rubbers lacking the novel modifiers of the invention were not satisfactory. Some of the reasons for this fact appear elsewhere herein.

Example 2

A rubber composition was made according to the procedure detailed in Example 1, except that plasticizer was present in an amount of 15 phr. An oil seal made from this product provided outstanding low temperature performance, demonstrating the heretofore unattainable ability to be useful as an oil seal in the range of -50° to -60°F. The seal also demonstrated desirable properties which were equal or superior to the control sample in every other respect. This seal showed a useful temperature range extending down to 40°F or more below that of other acrylate rubbers not incorporating the novel plasticizers of the invention. A rubber made in this manner had a torsional modulus at −22°C which was only in the range of four to five times greater than the torsional modulus at 25°C, whereas the composition of Example 2 showed a −22°C modulus which was approximately five to six times greater than the 25°C modulus. Accordingly, the lip of an oil seal made with this rubber is more flexible at reduced temperatures.

Example 3

A rubber composition was made which incorporated up to about 25 phr of the modifier or plasticizer described in connection with Examples 1 and 2. A rubber was produced which was very satisfactory for oil seal use at low temperature, although all desirable properties of oil seals being considered, the seal utilizing this amount of plasticizer was not necessarily improved in relation to the seal using about 15 phr of plasticizer, which appears to be within the most desirable range.

Example 4

A rubber composition otherwise similar to that of Example 1 was modified by the addition thereto of a polyether plasticizer of the polyethylene oxide type containing no methyl side chains and no propylene oxide groups. A typical example was a polymeric ethylene oxide produce furnished by Union Carbide Company under the trademark "Carbowax 1000", and having a molecular weight of about 1000. Such a plasticizer did not prove effective to impart desirable low temperature characteristics to an acrylate rubber composition while maintaining all the advantages thereof. Thus, considering that the rubber of the invention is primarily, although not exclusively, intended for the use in making oil seals, a pure ethylene oxide condensate is not effective as a modifier for such rubbers.

Example 5

A rubber composition was prepared which included about 15 phr of a plasticizer characterized by a recurring chain of n-butylene oxide units and having a molecular weight of about 7600. This polymeric plasticizer was available from Quaker Oats Company under the trademark "Polymeg"; it is believed to be manufactured from tetrahydrofuran, that is, it was a long chain polyether including recurrent aliphatic groups made by opening the chain of a heterocyclic, saturated furan. Such a compound is also often referred to as a poly(tetramethylene ether) glycol. The rubber composition made using this modifier was not satisfactory in respect to the low temperature capabilities able to be attained in the finished product using the modifiers or plasticizers of Examples 2 and 3.

Example 6

"Carbowax 6000", a material furnished by Union Carbide, and similar to the plasticizer of Example 4 except that it had a molecular weight of about 6000, was used in modifying an acrylate rubber. This plasticizer was not able to impart to rubber compositions of the type in question the low temperature characteristics desirable for use in oil seals while producing an otherwise satisfactory product.

Example 7

An acrylate rubber material was made using 15 phr of a block polymer of an ethylene oxide and a propylene oxide similar to Example 2, except that a molecular weight of about 12,000 was used. Satisfactory rubbers of increased low temperature utility in an oil seal application were able to be made in this way, and oil seals made therewith are easily capable of outstanding low as well as high temperature performance in all of the respects discussed herein.

Example 8

A low temperature acrylate composition was carried out utilizing a "Pluronic" brand ethylene oxide-propylene oxide plasticizer of the general type referred to herein but having a molecular weight of about 1,000 to 1,200. A rubber composition made with this material exhibited greatly improved low temperature performance in relation to an acrylate rubber made without the plasticizer. The rubber product appeared to be fully effective in bringing about increased low temperature performance. However, after 70 hours of exposure to oil at 300°F, a slight amount of the plasticizer was leached from the rubber composition. Accordingly, plasticizers of the general type described herein having molecular weights of from 1,000 up to 12,000 or more appear suitable for use with the invention, although those in the molecular weight range of about 1,000 to 2,000 are not as satisfactory on an all around basis in an oil seal application as those with somewhat higher molecular weights.

Example 9

Other rubber materials were made utilizing a block copolymer of ethylene oxide and propylene oxide of the type referred to herein, and having molecular weights varying from about 2,500 up to about 6,000. Acrylate rubber products made using these plasticizers possess an outstanding combination of low and high temperature performance potential and exhibited no harmful drawbacks of the type which would preclude their use in the oil seal field, or in other specialty fields where a combination of unusual properties are required.

Referring now to another incidental feature of polyether plasticizers having relatively low molecular weights, such plasticizers tend to be hygroscopic, picking up moisture from the air at a rapid rate, thereby increasing the difficulty of processing the polyacrylate rubber. Accordingly, although effective to bring about certain advantages of the invention in the molecular weight range of around 1,000 or less, the plasticizers most preferred for the invention have molecular weights of about 2,000 or more. As would be expected, the high molecular weight polyether type plasticizers of the invention tend to be of reduced effectiveness per unit of weight as the molecular weight approaches and passes through about 7,000 to 8,000. However, the acrylate rubbers made using such plasticizers are very advantageous and are particularly effective in specialty applications.

Example 10

An acrylate rubber composition was produced using about 15 phr of a commercial propylene glycol, that is, a plasticizer which was similar in structure to the plasticizer set forth in connection with Example 2, except that it was made entirely of polypropylene oxide units instead of some polypropylene oxide and some polyethylene oxide units. An acrylate rubber made using about 15 phr of this material also demonstrated improved low temperature performance when used in an oil seal rubber composition.

Referring now to other general features of the foregoing examples, it is preferred that polymeric materials, to be used as modifiers or plasticizers, be in the form of a liquid or paste; however, very low molecular weight plasticizers are sometimes undesirable volatile, and therefore, a molecular weight of 1,000 or over is preferred.

Referring now to forms of acrylate rubber or acrylic elastomers which may advantageously be combined with the modifiers or plasticizers of the invention, it has been indicated that the soap-sulfur curable polyacrylate may be modified by the addition of these plasticizers. In general, polyacrylate rubbers or elastomers are of a type having a plurality of ethylene groups arranged in a straight chain with nearly all ethylene groups having a single side chain attached thereto which contains an ethyl or other aliphatic group esterified thereon. All such side chains are totally saturated and are not reactive, and accordingly, the partial cross-linking necessary to achieve the final rubber or elastomeric product is attained by providing a few reactive sites for a cross-linking reaction. Accordingly, in approximately one unit in about 20, or about 5% of the side chain, monomers differ from the remainder of the monomers in structure. The three common types of these monomers, which are the cross-linking side groups used with acrylate rubbers, are 2-chloro-ethyl vinyl ether type side groups, vinyl chloride acetate side groups, and the alkyl-glycidyl-ether type side groups. The last mentioned type is an epoxy which is suitable for curing with an amine or amide type cross-linking agent, and this type is not generally preferred foruse with the invention. However, the 2-chloro-ethyl vinyl ether and the vinyl chloride acetate types are curable by the soap-sulfur method and acrylate rubbers or elastomers made using any suitable percentage of these cross-linking monomers may be made to display the advantages of the invention. Accordingly, the final product, aside from the plasticizer portion, is a somewhat cross-linked elastomer having a plurality of long carbon chains with pendant ester groups thereon, with occasional sites having a pendant group of slightly different structure, with an end portion thereof cross-linked to its counterpart (a like side group) on an adjacent carbon chain. The curing or cross-linking reaction takes place when the terminal or end portions of the reactive side groups react with one another, or with the curing agent and with one another.

By "soap-sulfur" curable is meant a product which is cured by a mechanism utilizing a soap such as potassium stearate or other soap material known to those skilled in the rubber compounding art, and which utilizes ordinary sulfur. As is known, a substantial variety of soaps and the like are operative in this environment.

The following structural formulas are set forth merely by way of illustrating compounds meant by certain of the terms used herein, as applied to the rubber compositions and to the plasticizers or modifiers contained therein.

The typical acrylate rubbers referred to above as containing a carbon chain with pendant ester groups may be illustrated as follows:

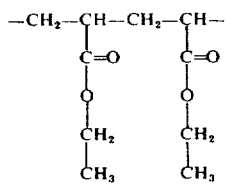

It will be noted that the monomers shown are ethylene esters; however, as brought out elsewhere herein, it is customary for the elastomeric product to contain a certain number of acrylate groups wherein a butyl group rather than an ethyl group forms the ester which terminates the side group. An elastomer formed from monomers of ethyl acrylate, butyl acrylate and a curing monomer is therefore sometimes referred to as an ethyl acrylate-butyl acrylate terpolymer.

The 2-chloro-ethyl-vinyl ether groups and the vinyl chloride acetate groups referred to above may be illustrated as follows:

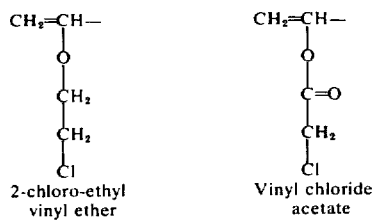

2-chloro-ethyl vinyl ether     Vinyl chloride acetate

The PLURONIC materials or equivalent block polymers formed by the polymerization of ethylene oxide and propylene oxide and which are preferred for use with the present invention are shown below to be terminated on both ends by hydroxyl groups, and to include chains having plural ether groups formed from ethylene oxide disposed to either side of a central chain of ether groups formed from propylene oxide. As will be noted from the illustrations below, each of the groups formed from the propylene oxide starting material includes a methyld side group or group attached to the side of the principal chain. Generally speaking, such compounds therefore include an alkane side group which is necessary for good plasticizing action. Such a compound is illustrated as follows, it being understood that the subscripts $a$, $b$, and $c$ indicate the number of each group present in a molecule, and thus relate to molecular weight:

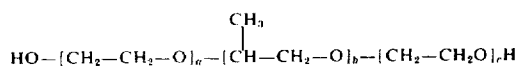

One type of polyether plasticizer, typified by a CARBOWAX type polyether, is formed solely from ethylene oxide, but does not contain an alkane side chain of any type.

The POLYMEG brand or poly(tetramethylene ether) glycol type of plasticizer referred to above as being based on tetrahydrofuran, was likewise not effective. It will be noted that this molecule also lacks an alkane side group:

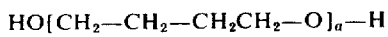

A polypropylene glycol of the type referred to in Example 10 is schematically shown below, and it will be noted that this is a polymer having hydroxyl terminated end portions and of a polyether type with alkane side elements. Such a material is commercially available from Union Carbide Company as POLYPROPYLENE GLYCOL 2025.

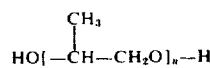

In practice the side chain is formed by the polymerization of a propylene oxide group of the type illustrated below, it being understood that the polymerization takes place through the oxygen to form the polyether linkage, thereby leaving the methyl group lying to the side of the primary polyether chain.

From the foregoing explanation, it will be noted that the expressions "ethylene oxide" and "propylene oxide" is often loosely used when describing polyethers or so-called polyether glycols. As used herein, the expression is intended to apply to the starting materials used to make the polyethers and not necessarily to the final products. Thus, by way of example, an alkane oxide having four carbon atoms might, depending on the location of the oxygen, polymerize to form a polyether molecule having side groups of either one carbon atom or two carbon atoms, while a propylene oxide unit, upon polymerization, normally yields a methyl side group as the alkane side group. However, it will be appreciated that ethylene oxide, having only two carbon atoms, does not form a polymer with an alkane side group. The present invention comprehends the use of various forms of polyethers, all of which possess at least some alkane side groups.

Example 11

Referring now by way of example to other polyacrylate rubbers or acrylic elastomers which may be used with the plasticizers of the invention, a low temperature acrylate polymer was obtained from the Polysar Corporation and identified by the trademark "XC-169". This was a soap-sulfur cure type ethyl acrylate-butyl acrylate terpolymer based rubber displaying low temperature characteristics in an unmodified state very similar to those described in connection with Example 1. By adding to this basic acrylate rubber material, any of the plasticizers described as being used successfully in connection with the foregoing examples, similar results were obtained. Other low temperature acrylate rubbers were obtained from other sources and displayed reactions to the novel plasticizers of the invention.

Polymers of the type referred to in Example 2 and elsewhere herein are referred to as "plasticizers" since this is one of their principal functions in the invention, with use as accelerators being another and apparently inherent function thereof. However, the disclosure herein of these materials for use as plasticizers is not meant to imply that these materials have ever been known to have been proposed in the past as plasticizers for curable compositions, particularly acrylate elastomer compositions, since it will be recognized by those skilled in the art that the polymers in question were prepared and are commonly sold as non-ionic surface active agents. However, in the present invention, the compounds are used as plasticizers. While the fact of their surface activity is not believed material for purposes of the present invention, the discovery of the fact that these polymers are useful as plasticizers for specialty rubbers requiring oil resistance, both hot and cold, low temperature flexibility, and retention of these characteristics for a long period, as well as heretofore unsuspected compatibility with known processing agents and methods, is totally unexpected in view of the other proposed and actual uses formerly made thereof, and in view of prior art materials earlier proposed for this or for related uses.

As pointed out above, one principal use of the low temperature polyacrylate rubbers of the invention is in the manufacture of improved oil and grease seals. Referring now to the drawings and in particular to FIG. 1, an oil seal generally designated 10 and made according to the invention is shown to include a mounting flange portion 12 of a steel stamping or like material and adapted to be received in an opening in a machine element. The seal 10 also includes a seal body portion 14 having a primary lip or shaft contact portion 16 defined by the junction of a pair of generally frusto-conical surfaces 18, 20. A garter spring 22 is normally provided for disposition within a groove 24 to insure that the primary lip 16 is held in contact with aan associated shaft.

By noting the undercuts or re-entrants in the contours of the body portion 14, it will be seen that hot tear strength is necessary in the rubbber seal material to enable the body to be removed from the mold, and accordingly, it is necessary that the body should be substantially cured before being removed from the mold. It may also be appreciated that, with the garter spring 22 urging the primary lip 16 against an associated shaft, brittleness of the body 14, and particularly the areas on or near the primary lip 16, which are of thin cross section, would definitely be subject to damage upon "dry starting", especially under conditions of little or marginal lubrication at very low temperatures.

Whereas prior art oil seals of the type illustrated in FIG. 1 were unsatisfactory at very low temperatures when made using prior art so-called low temperature acrylate rubbers, seals made with the compositions set forth in certain of the above examples performed excellently at temperatures of −30° to −40°F or even lower.

Referring now to another important feature of the invention, an incidental advantage of the modifiers of the type discussed herein, and particularly those which were effective to increase the low temperature performance of the acrylate, showed an unusual and unexpected benefit in the curing behavior of the rubber compositions. In rubber compounds which are cured to form molded rubber products, the ideal rubber or elastomer compound is one which, upon application of sufficient heat to place it in a fluid state, remains fluent or of relatively low viscosity for whatever length of time is required to carry out the molding operation, and which thereafter rapidly sets or cures so that the molded part may be removed from the mold. In the past, it has generally been thought that although rubber may be made to cure rapidly, the so-called pre-scorch time or period of substantial fluidity is greatly decreased as the overall cure time decreases. On the other hand, rubbers remaining in a fluent or pre-cured state for an increased time tend to have very low rates of cure increase. Although the kinetics of rubber curing are relatively complex, a normal curing curve shows a relatively high viscosity of the material until it is heated sufficiently to become somewhat molten, whereupon the viscosity drops for a period of time and then begins to rise, first slowly and then more rapidly. After this rise has occurred to a predetermined extent on an arbitrary scale, the rubber is considered to have portions thereof initially cured or to be "pre-scorched". Thereafter, the viscosity increases relatively rapidly and ultimately levels off, "cure" being considered to be a point at which about 90% of the ultimate cured "viscosity" has been reached. As was pointed out before, curves having a long abcissa representing the time elapsed to initial scorch generally show a gradual increase in cure, and rubbers with a short working life or a short pre-scorch span cure at a much greatly increased rate once substantial curing is initiated. However, the modifiers or plasticizers of the present invention seem also to serve as accelerators, particularly accelerators for the latter phase of the cure, while unexpectedly at the same time serving to maintain or extend the duration of initial low viscosity. Accordingly, to a greater or less degree, acrylate rubber compositions incorporating the novel plasticizers or modifiers desirably show an increased pre-scorch time for ease of molding and also desirably show a greatly increased final cure rate (decreased overall cure time) for early high strength, thereby making these compositions very attractive to product molders from a processing standpoint.

These characteristics are indicated in FIGS. 2–4, which show respectively, the curing behavior of a typical plasticized composition of the invention, the curing characteristics of a prior art composition which is otherwise similar but which lacks the novel plasticizers of the invention, and the curing characteristics of a theoretically ideal material.

Referring now in particular to FIG. 2, it may be seen that, with viscosity the Y-axis and time the X-axis, the solid line curve shows a rapid decrease of viscosity in the area "A", a low viscosity in the "B" area and a rather steeply rising curve in the "C" area. Having in mind that viscosity increases upwardly in the graph and that increased time lies to the right, it may be seen that from an initial, relatively high viscosity "H", the viscosity drops to an arbitrary low point "L", where it remains for a certain time, following which it begins, as at "M", to rise rather steeply, and then continues upwardly first more steeply and then more gradually. In practice, point I is the initial viscosity of the uncured rubber composition at low temperature when it is placed in the mold. Upon heating, the rubber becomes much less viscous and, prior to cure, is in a fluent state for molding. Accordingly, the area A of the curve indicates that applied heat is rapidly decreasing the viscosity of the rubber. Area B, in the form of a trough, represents a time of minimum viscosity when the rubber has not achieved substantial cure so as to increase its viscosity, but has nevertheless been softened by the application of heat.

However, after the curing reaction begins to predominate, the viscosity starts to rise, first gradually and then more rapidly. Therefore, at point "M", sometimes referred to as the "two point rise time", the viscosity has increased noticeably beyond the minimum. After point M, it will be noted that the curve C rises toward and ultimately through point "N", but does not reach a definite, flat plateau. When point N is reached, the rubber is considered cured, even though an arbitrary standard applied in the industry establishes point N as being the point at which 90% of ultimate cure is established.

Referring now to an explanation of the shape of FIG. 2, it may be seen that a pair of dotted line curves "X" and "Y" are present. These lines are intended to show that the solid line curing curve is a composite of two elements or factors, the first being shown in curve X and representing decreased viscosity with the application of heat. The level approached by curve X shows the minimum viscosity which a given rubber composition would achieve when heated to a working temperature in the absence of any cure. Curve Y reflects the kinetics of the curing reaction, namely, a continually increasing viscosity effect. The composite or solid line curve shows that the curing rate of the rubber should have minimal effect in the early portion of the molding cycle when heat softening occurs, but that the curing effect gradually predominates, causing the viscosity to rise as shown on the right hand side of FIG. 2.

By comparing corresponding parts of FIG. 2 with those of FIG. 3, the advantages of the present invention just discussed may be more easily appreciated. Thus, although it will be seen that the forms of curves of FIGS. 2 and 3 are generally similar, it will be noted that the trough or B portion of FIG. 2 is elongated in respect to that of FIG. 3, while the right hand or C portion of the curve of FIG. 2 is inclined at a steeper angle than its counterpart in FIG. 3. Thus, it can be seen that a prior art composition having the characteristics of FIG. 3, after becoming fluid, would remain fluid for a shorter time than a counterpart composition having therein the improved plasticizers of the invention, and would also cure less rapidly than an improved composition corresponding to the invention.

Referring now to FIG. 4, a curing curve for an ideal, purely theoretical material is shown for purposes of illustrating that the curing characteristics of the improved composition of the invention more closely approach the ideal than those of prior art compositions. As shown in FIG. 4, an ideal composition would be one wherein heat softening would take place substantially instantly, so that no time would be lost heating the composition, the trough portion would be of a desired, predetermined extent, based upon whatever time would be considered necessary to form or shape the molded part, the viscosity remaining at a constant, predetermined level during this time, and the C or curing curve would be as steep as possible, namely, cure would be substantially instantaneous after sufficient time had been spent to form the article in question. Thus, a completely cured article could be removed from a mold immediately after the article was formed. Needless to say, such behavior is entirely theoretical, and has not been approached in actual practice by any known acrylic elastomers.

The importance of the fast curing rate may be understood when it is realized that maximum mold utilization, especially in mass production, calls for removing parts as soon as possible after molding is completed, while incompletely curing parts cannot be removed from the mold because of the danger of tearing or otherwise damaging them.

Referring again to disadvantageous characteristic features of some modified or plasticized prior art compositions, the use of plasticizers intended to impart better characteristics to nitrile rubbers has been found to increase the absorption of oil within the rubber polymer. As a result, an unusual phenomenon takes place in such rubbers which is very undesirable. When immersed for a time in hot oil, the modulus of elasticity and hardness of a typical nitrile rubber first undergo a relatively radical drop within a short time, that is, within from only a few hours up to about 50 or 100 hours of exposure. Thereafter, the nitrile rubber compositions would gradually but noticeably undergo hardening, soon becoming far too hard for practical use. This was believed to be accounted for by absorption of oil within the rubber molecules, with or without leaching out of the plasticizer, and by reaction of the extreme pressure additives in the oil with the rubber components, thereby further curing the rubber to an undesirably extreme degree of hardness. Accordingly, in contrast to the improved acrylate rubbers of the invention, modified nitrile rubbers fail rapidly in use when exposed to hot oil. The modified rubbers of the invention, however, are outstanding in their maintenance of physical characteristics at a constant level after exposure to the conditions they are expected to encounter.

Referring now to various aspects of the invention not discussed in detail above, it will be appreciated that a typical rubber which is most commonly used in the present invention is one which includes both the butyl acrylate and the ethyl acrylate monomers referred to above as well as one of the cross-linking monomers. Thus, it is well known that although butyl acrylate based elastomers themselves have excellent low temperature flexibility, the degree to which they absorb oil, and to which oil swelling characterizes their behavior, totally disqualifies such rubbers from use in oil environments. The ethyl acrylate-based elastomers have excellent oil resistance, but are relatively brittle and lack low temperature performance. Accordingly, all previous attempts to make low temperature acrylate rubbers for use in environments wherein oil exposure is a necessary condition involved compromise materials such as the ethyl acrylate-butyl acrylate-cross-linking monomer-based terpolymers described above. Again referring to the above examples, the starting materials, as pointed out, were those already blended by commercial manufactures so as to optimize the combination of low temperature flexibility and resistance to oil. Accordingly, the invention is directed to a further improvement in materials which were already believed, at the time of the invention, to be the best available for this purpose.

Referring again to the general state of the acrylate rubber art, polyacrylate rubbers are well know as specialty elastomers designed for use in applications where other elastomers are not capable of performing, either at the same level or having the same economic capabilities. Accordingly, it is well-known in industry that a number of elastomers, which include thiokol, butyl, epichlorhydrin, nitrile, neoprene, fluorocarbon, silicones and fluorosilicone rubbers are all available for use as oil seals. However, the selection of a material depends on more than mere commercial availability. Merely by way of example, a typical oil seal must often be capable of affording protection against both oil and air at highly elevated temperatures, e.g., 350° and 425°F, while retaining flexibility and lubricity at greatly reduced temperatures, e.g., −10° to −50° or lower.

It is well known to oil seal makers that thiokol, butyl, epichlorhydrin, nitrile and neoprene rubbers are unable to seal both air and oil above 250°–275°F. Moreover, as these temperatures are reached, the performance of these rubbers in sealing operations degenerates considerably. Accordingly, where it is desired to seal oil even in the 350°–375° range, the foregoing rubbers are simply inadequate.

Almost all acrylate rubbers, silicones and fluorocarbons or fluorosilicones are capable of withstanding these high temperatures. Of these, however, ordinary silicones are the only materials which consistently display low temperature flexibility of the same order as butyl, nitrile or neoprene rubbers, for example. Moreover, silicone rubbers swell appreciably in oil and display outstanding resistance to hot air. At present, ordinary and substituted silicones and fluorocarbons are extremely expensive. Moreover, some fluorocarbon materials are often more thermoplastic than cross-linked, and since such materials undergo cold flow, they create significant problems of dimensional stability, particularly in sealing environments.

In some cases, silicones, which are highly expensive, were used where the requirement for low temperature flexibility was paramount. However, silicones have somewhat inferior oil resistance in relation to acrylates. Where fluorocarbons were used, low temperature characteristics were not measurably better then those of acrylates in many cases, although they may have been somewhat improved in certain instances. Since both fluorocarbons and silicones are almost prohibitively expensive, the use of nitrile rubbers persisted for many applications, with attempts being made to keep oil and air temperatures at low levels. In other cases, the low temperature characteristics of acrylates were lived with as best they could be. Thus, in some European countries and other temperature climates, certain acrylic elastomers were satisfactory provided extreme conditions were not encountered.

While the art recognizes that the improvements in low temperature flexibility were greatly desired for acrylate materials, and while providing plasticizers for this purpose is a good theoretical answer to the low temperature problem, the actual process of making improved acrylates capable of use in oil seal applications was nonetheless almost always unsuccessful in practice.

The reasons for this are that ordinary plasticizers of the prior art create one, two or three drawbacks, i.e., many plasticizers were excessively soluble in oil, thereby being susceptible to loss during use with resultant seal failure; other plasticizers may have improved flexibility but have correspondingly lowered the high temperature performance of the rubber product to levels such that it corresponded with nitriles and thus eliminated the original advantage of the acrylate materials; and thirdly, in many cases, the plasticizer interfered with the curing process or physically disappeared during such process.

Accordingly, the literature which was current at the time the invention was made suggested combination polyetherpolyester plasticizers; however, such materials were unduly volatile and were extracted by oil from a finished seal. Thus, combinations containing this type of plasticizer are unsatisfactory for making oil seals.

Furthermore, the conventional or pure polyester plasticizer, such as phosphates or fatty esters are not suitable for plasticizers, either because of their physical form, or because of oil extractability, or both.

Polyethylene glycol materials, including both polyether glycols and plyether glycol esters are likewise not satisfactory, for generally the same reasons, and for other reasons as well. As already brought out, linear, unbranched polyethers such as the furan-based poly(tetramethylene ether glycol) polymers are not satisfactory.

Literature which was current at the time the invention was made also teaches that, as plasticizer is added to the materials, tensile strength and the 100% modulus diminish considerably, as do the hardness of the rubber and the tendency thereof to take a compression set.

Literature published in 1970 indicates that even with the use of plasticizers which were among those most highly recommended, the plasticized material was unable to continue to demonstrate low temperature flexibility which was substantially better than that of an unmodified material after soaking in hot oil, a material to which almost all oil seals are exposed in use.

Thus, for example, according to the literature, three specimens of an acrylate rubber were prepared, one being unmodified, the second containing 10 phr of plasticizer "TP-95". This plasticizer was identified as a polyether-ester, i.e., di(butoxyethoxyethyl) adipate, made by Thiokol Chemical Corp. When tested for low-temperature flexibility by ASTM test method D 736, the first specimen presented a temperature of −8° F, the second specimen showed −20°F, and the third specimen a −45° F value. However, after No. 3 oil aging, the second specimen reverted to a −9°F figure and the third specimen reverted to a −11°F figure. In other words, after encountering conditions normally expected to be met in use as an oil seal, the plasticizer retained less than 8% of its original effectiveness. Similar results were obtained with a di(butoxyethoxylethyl) formal plasticizer identified as "TP 90B".

In addition, the literature proposes as plasticizers a polyethylene glycol dioctylate ("Flexol 4 GO"), a number of other polyesters, such as "Paraplex G-50", and even certain nonionic surfactants including alkyl-aryl polyoxyethylene materials, and others. Of these plasticizers most recommended by one manufacturer, the best reduces the low temperature brittle point by only 6° or 7° after 70 hours in hot oil, even after a long post-cure.

The present invention, on the other hand, is directed to the use of a particular, carefully identified family of chemical compositions which provides a cured polyacrylate rubber product which has all of the high temperature capabilities and other advantages of an unmodified polyacrylate rubber with the additional advantage of both improved curing behavior and much lower temperature flexibility. For use as an oil seal material, the modified polyacrylate rubbers of the invention are in effect, new seal materials, since seals made with such materials possess properties not possessed by seals made of any other materials.

Referring now to "processability" or curing behavior, an advantage of the compositions of the present invention is that these additives, modifiers or plasticizers do not adversely affect the curing behavior of the compositions, and in most instances, actually bring about (a) reduced initial viscosity, (b) a longer "working" period before increased viscosity occurs, and (c) a much faster cure thereafter, with a reduced over-all curing time.

Merely by way of an example, a comparison was made between an unmodified polyacrylate terpolymer of the type referred to above as the control sample, and a material having the formula of Example 1. While the control composition demonstrated an initial viscosity (Micro-Die method) of 59, a minimum viscosity of 17.5, with a two-point rise time of 2 min. 10 sec., and a 90% cure time of 8 min. 17 sec., the improved composition demonstrated an initial viscosity of 50, and a minimum viscosity of 9.5, with a two-point rise time of 1 min. 55 sec. and a 90% cure time of 4 min. 40 sec.

Thus, the modifier quite unexpectedly showed the ability to extend the working time 15 seconds, to cut the 90% cure time almost in half, and to provide greatly reduced viscosity during the time the molding operation is carried out. Rubbers of the other examples using the preferred modifiers or plasticizers referred to herein showed qualitatively similar results, all of which may be said to relate to improved processability. Accordingly, the invention provides a rubber material and seals made therefrom which are improved in not merely one, but in a number of respects in relation to the prior art.

In contrast, a number of chemically somewhat similar plasticizers suggested in the prior art for other plasticizing uses inhibit the curing time and reduce the processability of acrylate elastomers modified thereby. For example, the poly(tetramethylene ether) glycols discussed herein substantially inhibited the curing of the acrylate control rubber specimen referred to just above. Likewise, certain non-branched polypropylene glycols suggested for use as plasticizers in other compositions considerably slowed the curing of such control rubber. Thus, not every polyether glycol useful as a plasticizer is useful in the practice of the invention, which is confined to the compositions described and claimed herein, and their equivalents.

It will thus be seen that the present invention provides novel compositions and methods for making improved modified rubber compositions and improved oil seals and other articles made therewith, such methods, seals and other articles having a number of advantages and characteristics, including those referred to herein and others which are inherent in the invention. Representative examples only having been taught herein, it will be understood that variations and modifications may be made to the formulas and products set forth in the foregoing examples without departing from the spirit of the invention or the scope of the appended claims.

I claim:

1. An oil seal unit comprising a relatively rigid mounting portion and a flexible body portion having a lip adapted to engage a part to be sealed, said lip being formed from a modified, oil resistant cured acrylate elastomeric composition having, in relation to otherwise similar but unmodified acrylate rubber compositions, substantially greater low temperature flexibility and substantially unchanged resistance to attack by hot air and hot oil, said modified composition comprising a cured polymer of an acrylate material and including therein up to about 25% of a modifying material comprised of an aliphatic polyether composition, said modifying material further having terminal hydroxyl groups, having at least a substantial portion of lower alkyl side groups, and having a molecular weight of from at least 1,000 up to about 12,000.

2. A seal as defined in claim 1 in which said up to about 25% modifying material comprises from about 5% to about 25% of said modifying material.

3. A seal as defined in claim 1 in which said modifying material is present in an amount of about 15%.

4. A seal as defined in claim 1 in which said modifying material has a molecular weight of from about 3,500 to 7,000.

5. An oil seal unit comprising a relatively rigid mounting portion and a flexible body portion having a lip adapted to engage a part to be sealed, said lip being formed from a modified, oil resistant cured acrylate elastomeric composition having, in relation to otherwise similar but unmodified acrylate rubber compositions, substantially greater low temperature flexibility and substantially unchanged resistance to attack by hot air and hot oil, said modified composition comprising a cured acrylate elastomer containing up to about 25% of a modifier in the form of a block polymer formed from repeated propylene oxide units and repeated ethylene oxide units, and including a plurality of alkane side groups having four or less carbon atoms each, said polymer being hydroxy-terminated and having a molecular weight of from about 1,000 to about 12,000.

6. A seal as defined in claim 5 wherein said up to about 25% modifier is from about 6% to about 15% modifier.

7. A seal as defined in claim 5 in which said modifier has a molecular weight of from about 3,500 to about 7,000.

* * * * *